United States Patent
Calio et al.

(10) Patent No.: US 9,933,830 B2
(45) Date of Patent: *Apr. 3, 2018

(54) VALIDATING POWER PATHS TO IT EQUIPMENT

(71) Applicant: International Business Machines Corporation, Armonk, NY (US)

(72) Inventors: Robert J. Calio, Red Hook, NY (US); Daniel M. Chlus, Highland, NY (US); Michael J. Domitrovits, New Paltz, NY (US); Michael J. Frissora, Wappingers Falls, NY (US); Sal M. Rosato, Pine Plains, NY (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/862,196

(22) Filed: Sep. 23, 2015

(65) Prior Publication Data

US 2016/0378162 A1  Dec. 29, 2016

Related U.S. Application Data

(63) Continuation of application No. 14/749,707, filed on Jun. 25, 2015, now Pat. No. 9,727,117.

(51) Int. Cl.
G06F 1/00 (2006.01)
G06F 1/32 (2006.01)
(Continued)

(52) U.S. Cl.
CPC .............. *G06F 1/3209* (2013.01); *G06F 1/26* (2013.01); *G06F 1/263* (2013.01); *G06F 1/28* (2013.01);
(Continued)

(58) Field of Classification Search
CPC .......... G06F 1/28; G06F 11/3006; G06F 1/26; G06F 1/266; G06F 1/263
See application file for complete search history.

(56) References Cited

U.S. PATENT DOCUMENTS

| | | | |
|---|---|---|---|
| 8,497,779 B1 * | 7/2013 | Waide | G06F 11/2015 340/636.1 |
| 8,519,843 B2 | 8/2013 | El-Essawy et al. | |

(Continued)

FOREIGN PATENT DOCUMENTS

| | | |
|---|---|---|
| CN | 101800574 A | 8/2010 |
| JP | 2006216996 A | 8/2006 |
| JP | 2010233321 A | 10/2010 |

OTHER PUBLICATIONS

IBM: List of IBM Patents or Patent Applications Treated As Related (Appendix P), Sep. 30, 2015, 2 pages.

(Continued)

*Primary Examiner* — Mohammed H Rehman
*Assistant Examiner* — Gayathri Sampath
(74) *Attorney, Agent, or Firm* — David Zwick

(57) ABSTRACT

A computer-implemented method for identifying power line segments and power line redundancies in a datacenter are provided. The computer-implemented method for identifying power line segments and power line redundancies in a datacenter include; transmitting a data packet from equipment compilers to a host program, where the data packet includes unique datacenter equipment identifiers, the datacenter equipment includes IT equipment and a power source; identifying one or more power line segments from the power source to the IT equipment; and determining an existence of a power line redundancy between the power source and the IT equipment.

3 Claims, 5 Drawing Sheets

(51) Int. Cl.
*H02H 1/00* (2006.01)
*H02J 4/00* (2006.01)
*G06F 1/26* (2006.01)
*G06F 11/30* (2006.01)
*G06F 1/28* (2006.01)

(52) U.S. Cl.
CPC ...... *G06F 11/3006* (2013.01); *G06F 11/3051* (2013.01); *G06F 11/3058* (2013.01); *G06F 11/3065* (2013.01); *H02H 1/0007* (2013.01); *H02J 4/00* (2013.01); *G06F 1/266* (2013.01)

(56) References Cited

U.S. PATENT DOCUMENTS

| | | | |
|---|---|---|---|
| 8,683,251 | B2 | 3/2014 | Archibald et al. |
| 9,058,156 | B2 | 6/2015 | Alshinnawi |
| 2004/0177283 | A1 | 9/2004 | Madany et al. |
| 2009/0287949 | A1 | 11/2009 | Bradicich et al. |
| 2011/0140911 | A1 | 6/2011 | Pant et al. |
| 2011/0320827 | A1* | 12/2011 | Siegman ............ G06F 1/266 713/300 |
| 2013/0031399 | A1 | 1/2013 | Watson |
| 2013/0212419 | A1 | 8/2013 | Hilburn et al. |
| 2013/0236184 | A1 | 9/2013 | Washiro |
| 2014/0164814 | A1 | 6/2014 | Henise, IV et al. |
| 2014/0191579 | A1 | 7/2014 | Szu |
| 2015/0220124 | A1 | 8/2015 | LaBerge |

OTHER PUBLICATIONS

Pending U.S. Appl. No. 14/749,707, filed Jun. 25, 2015, entitled: "Validating Power Paths to IT Equipment", 27 pages.

Papaioannou et al., "Evaluation of Power Line Communication Equipment in Home Networks", IEEE Systems Journal, vol. 3, No. 3, Sep. 2009, pp. 288-294.

Grassi et al., "Channel Characterization and EMC Assessment of a PLC System for Spacecraft DC Differential Power Buses", IEEE Transactions on Electromagnetic Compatibility, vol. 53, No. 3, Aug. 2011, pp. 664-675.

Pending U.S. Appl. No. 14/749,707, filed Jun. 25, 2015, entitled: "Validating Power Paths to IT Equipment", pp. 1-27.

* cited by examiner

VALIDATING POWER PATHS TO IT EQUIPMENT

BACKGROUND

The present invention relates generally to the field of datacenter architecture, and more particularly to the monitoring, visualization, and alarming systems to identify the existence of power redundancies in power line segments between information technology (IT) equipment and power sources.

Power Distribution Units (PDUs) are commonly employed to distribute power to electronic devices. One environment in which PDUs are commonly used is a datacenter. A datacenter is a facility used to house electronic devices such as computing systems. These computing systems may be used for storage, application processing, and network traffic routing purposes. It is important that such systems be provided with an uninterrupted supply of power. PDUs typically draw power from a supply circuit equipped with circuit breakers, which is connected to a power feed (i.e. power from a power company's electrical grid) and then supply that power to the power supply units connected to electronic devices, such as computing systems. A power supply unit typically draws power with a particular voltage from a PDU and transforms that power into a form that is readily usable by the electronic circuitry of a given computing system.

Many large scale electronic devices such as the computing systems typically used in a datacenter are powered by multiple power distribution units. A datacenter computing system typically receives power from at least two different power distribution units (which can include electrical outlets) with each power supply unit receiving power from a PDU. The two power supply units powering the computing system may or may not be receiving power from the same PDU, however, having a computing system draw power through multiple PDUs, which are connected to different circuits, improves the reliability of the computing system. For example, a particular computing system may be drawing power through two different PDUs, each PDU receiving power from a different circuit connected to a power feed. Supplying power with such an arrangement allows the computing system to continue receiving power in the event that one PDU or circuit is disrupted (i.e., power supply redundancy/reliability).

As the environments in which PDUs operate become more complicated, power distribution network structures also become increasingly complex. A computing system which utilizes power supply redundancy often draws power from multiple power supply units which must be installed in a specific manner to minimize the possibility of a single point of failure in the system. In the process of setting up a power distribution network or expanding it, human error may leave some electronic devices without a fully redundant power supply through the incorrect connection of power supply units to PDUs.

SUMMARY

According to an embodiment of the present invention, a computer-implemented method for identifying power line segments and power line redundancies in a datacenter is provided. The computer-implemented method may include: transmitting a data packet from equipment compilers to a host program, wherein the data packet includes unique datacenter equipment identifiers, and the datacenter equipment includes IT equipment and a power source; identifying one or more power line segments from the power source to the IT equipment; determining the location of the datacenter equipment in one or more of the power line segments; and determining an existence of power line redundancy between the power source and the IT equipment.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

Figure 1:
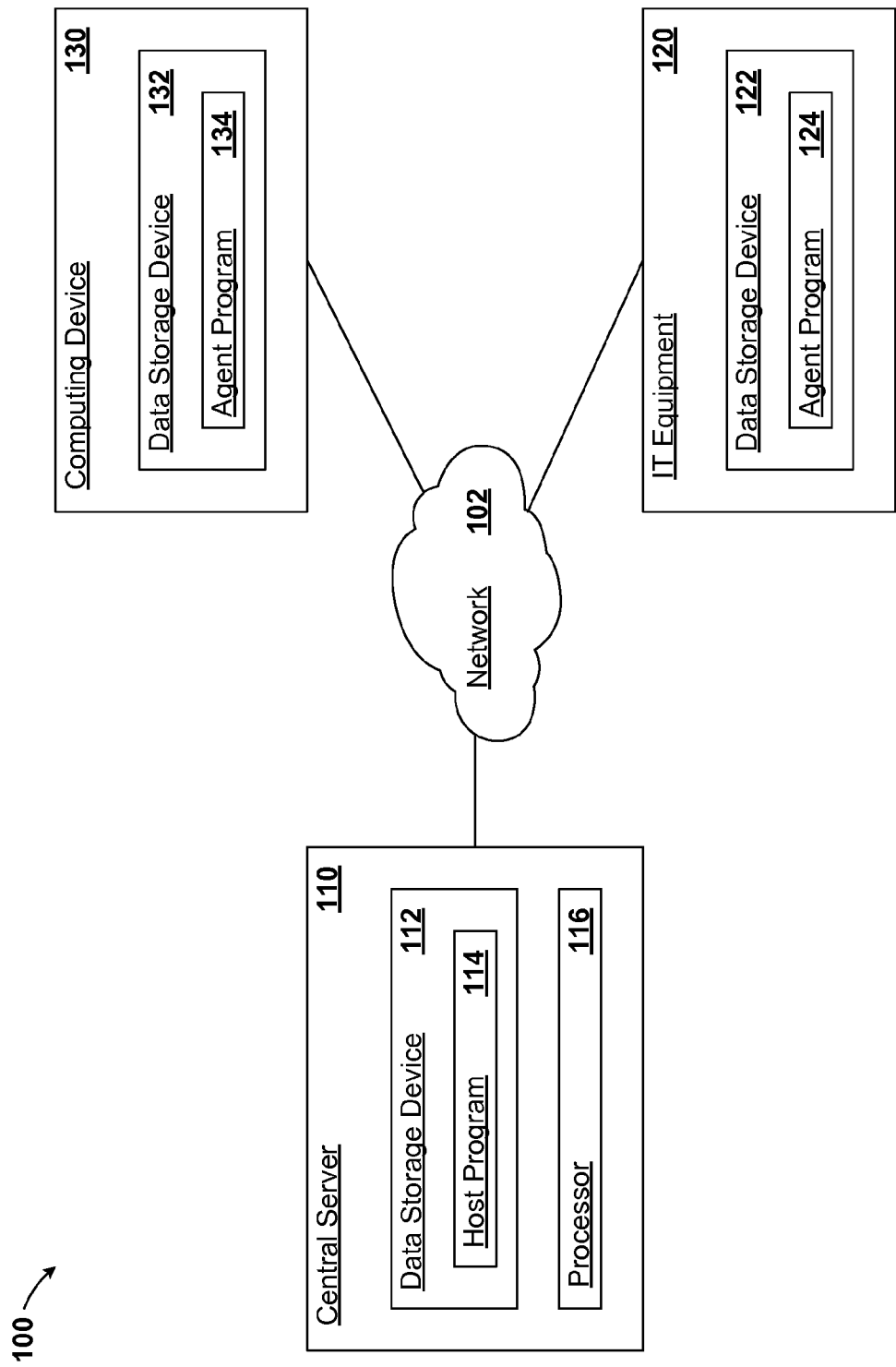
FIG. 1 illustrates a networked computer environment, according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention relates generally to the field of datacenter architecture, and more particularly to the monitoring, visualization, and alarming systems to identify the existence of power redundancies in power line segments between IT equipment and power supply distribution units. Ideally, it may be desirable to design a datacenter where IT equipment has two or more power line feeds from different power sources to allow for continuous power in the event of equipment failure or repair. One way to determine whether there is a power redundancy between IT equipment and a power distribution unit is to utilize the Ethernet over power technology to transmit datacenter equipment identifiers to a database for analysis. One embodiment by which to determine power redundancies in a datacenter is described in detail below, referring to the accompanying drawings FIGS. 1-5.

Referring now to FIG. 1, a datacenter network environment 100 is illustrated, according to an exemplary embodiment. The datacenter network environment 100 may include IT equipment 120, a computing device 130, and a central server 110, only one of each is shown in the exemplary embodiment.

The datacenter network environment 100 may include various types of communication networks, such as a wide area network (WAN), local area network (LAN), a telecommunication network, a wireless network, a public switched network and/or a satellite network. It should be appreciated that FIG. 1 provides only one exemplary embodiment and does not imply any limitations with regard to the environments in which different embodiments may be implemented. Modifications to the exemplary environment may be made based on design and implementation requirements.

The computing device 130 may communicate with the central server 110 via a communications network 102. The communications network 102 may include connections, such as wire, wireless communication links, or fiber optic cables. As will be discussed further with reference to FIG. 5, central server 110 may include internal components 502a and external components 504a, respectively, and computing device 130 may include internal components 502b and external components 504b, respectively. Certain internal components are illustrated in FIG. 1 for demonstrative purposes. The central server 110 may include a host program 114 stored on a data storage device 112 and may operate using processor 116. The computing device 130 and the IT equipment 120 may have agent programs 134, 124, respectively, stored on data storage devices 132, 122, respectively. The illustrated internal components may be similar to the components described with reference to FIG. 5. It should be noted; the configuration of the programs, data storage devices, or processor may be located on any computing device or equipment within the datacenter network environment 100.

Figure 2:
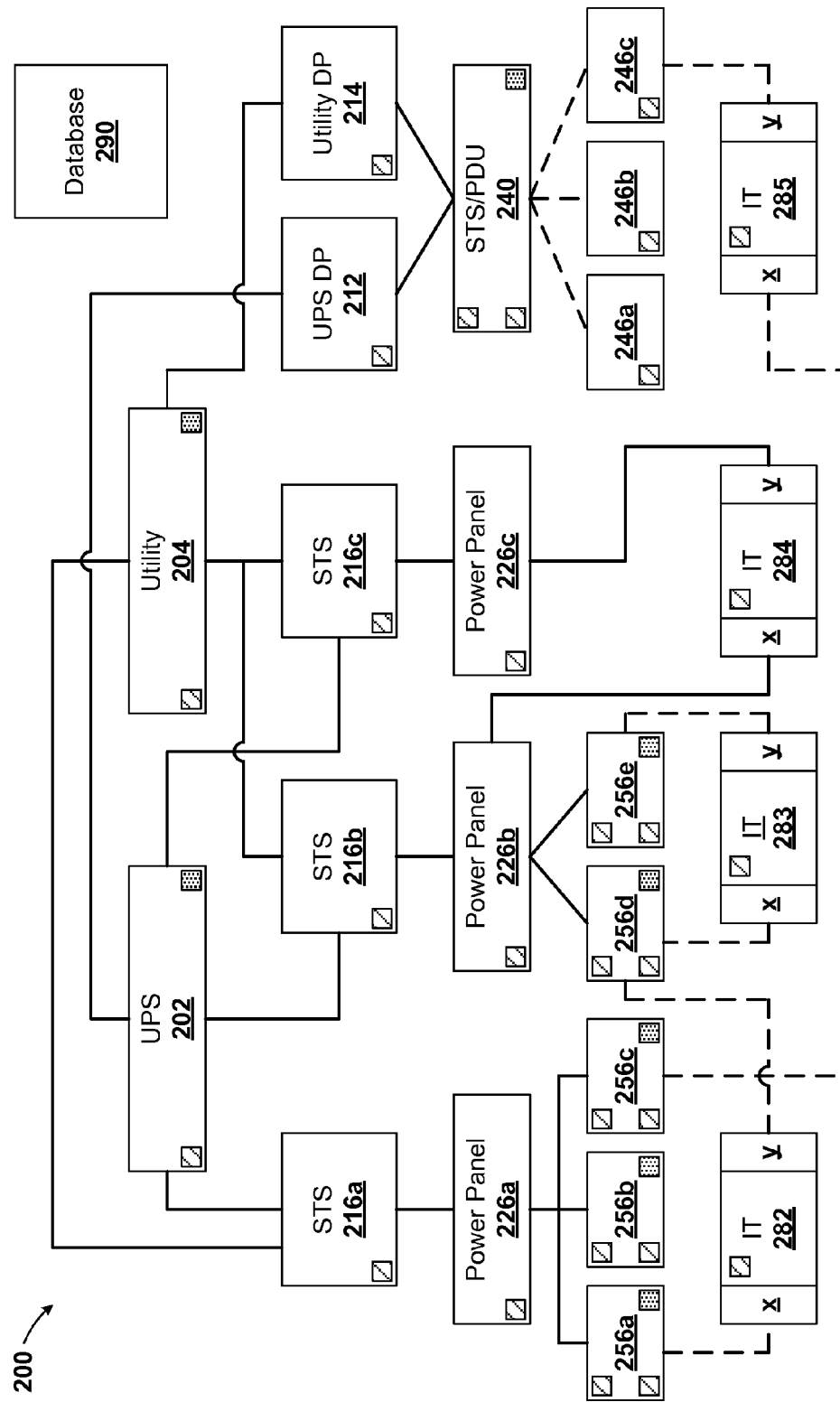
FIG. 2 illustrates a datacenter including power line segments between a power supply unit and datacenter equipment, according to an embodiment.

Referring now to FIG. 2, a diagram of a datacenter 200 is illustrated, according to an exemplary embodiment. More specifically, multiple power line segments (i.e., a power supply path) between IT equipment and power supply units are provided to illustrate whether or not the IT equipment has a desired power redundancy.

A typical datacenter may include power redundancies to prevent power outages to IT equipment. A power redundancy can provide a means to replace or repair datacenter equipment between IT equipment (e.g., servers) and power distribution units without a loss of power to the IT equipment. For example, a public utility power supply may supply power to a power distribution unit (PDU), where the PDU supplies power to a server rack. If there is a power redundancy to the server rack through a second PDU or some other means, the PDU can be replaced or repaired without a loss of power to the server rack.

The type of equipment and location of the equipment within the datacenter 200 is information that should be determined to assist in the vastly growing field of datacenter architecture. In the present invention, discrete power line segments can be mapped out by transmitting unique identifiers from each piece of equipment within the datacenter 200. The unique identifiers can be supplied by, for example, the concatenation of equipment identifiers and/or power supply identifiers. In an exemplary embodiment, each piece of equipment within the datacenter 200 can be equipped with a transmitter (illustrated as a hatch box) which transmits unique identifiers to equipment compilers (illustrated as a dotted box). The unique identifiers may be transmitted using, for example, Ethernet over power to the equipment compilers. However, data may not be able to be transmitted across datacenter equipment that transforms the power from 480V to 208V or vise versa, such that the equipment compilers should be strategically placed at the power supply units and any datacenter transformers. The equipment compilers can then send a data packet including the unique identifiers to a database 290 for analysis to determine the type of equipment and the location of the equipment within a power line segment.

In the illustrated embodiment, datacenter 200 includes two power supply units to a plurality of datacenter equipment. The two power supply units include an uninterrupted power supply (UPS) 202 and a public utility power supply (hereinafter referred to as "utility") 204. However, any number of power supply units may be used, including a single power supply unit or more than two power supply units (e.g., including a second UPS or a generator). The power supply units may supply 480V to the datacenter equipment which may be transformed to 208V before the power is received by a server within a server rack. In the illustrated embodiment, power lines supplying 480V are illustrated as solid lines and power lines supplying 208V are illustrated as dotted lines.

To determine the power line segments from the power supply units to the IT equipment, each piece of datacenter equipment within the datacenter 200 will now be described in further detail. The UPS 202 and the utility 204 may supply power to a UPS distribution panel 212 and a utility distribution panel 214, respectively, as well as three static transfer switches (STS) 216a-216c. The utility DP 212 and the utility DP 214 may supply power to an STS/PDU 240. Each STS can switch between power sources (e.g., UPS 202 and utility 204) to supply power to other datacenter equipment. The STS/PDU 240 may transform the 480V to 208V. The power transformation of the STS/PDU 240 is an example of an ideal location for an equipment compiler to send a data packet including unique identifiers from datacenter equipment that is downstream from the STS/PDU 240 (e.g., power panels 246a-246c) to the database 290.

The STS's 216a-216c supply power to power panels 226a-226c, which further distribute the power to other datacenter equipment. The power panels 226a-226c do not transform the power so an equipment compiler may not be required at those locations, however, transmitters are located on the power panels 226a-226c to transmit unique identifiers.

Power panel 226a and power panel 226b supply power to PDU's 256a-256e. In the exemplary embodiment the PDU's 256a-256e transform the power from 480V to 208V, which may require a transmitter to transmit serial number identifiers of the PDU's 256a-256e to the power sources, as well as an equipment compiler to transmit a data packet to the database 290 including serial number identifiers from equipment downstream from the PDU's 256a-256e.

The PDU's 256a-256e, power panels 226b, 226c, and power panels 246a-246c supply power to IT equipment 282-285. In an embodiment, IT equipment 282-285 include server racks each having an on-rack PDU x, y, where the PDU's x, y distribute power to one or more servers within the server racks. Each server within the server rack may include a transmitter that transmits a unique server identifier to the equipment compilers.

The power line segments that supply power to IT equipment 282 and IT equipment 283 will now be discussed, according to an exemplary embodiment. IT equipment 282 has a redundancy in power whereas IT equipment 283 does not have a power redundancy. As described above, a power redundancy exists when IT equipment is supplied with power from two or more discrete power line segments. IT equipment 282 has a first power line segment starting from STS 216a, which travels through power panel 226a and PDU 256a. IT equipment 282 has a second power line segment starting from STS 216b, which travels through power panel 226b and PDU 256d. The power redundancy allows for the repair or replacement of the datacenter equipment in the first power line segment while IT equipment 282 is continuously supplied with power through the second power line segment and vise versa.

IT equipment 283 does not have a power redundancy because both power inputs are commonly fed through power panel 226b and STS 216b. The lack of power redundancy results in a loss of power to IT equipment 283 if either the power panel 226b or STS 216b are removed or replaced.

The location, power redundancy and/or lack of power redundancy can be determined through the data packets transmitted from the equipment compilers in PDU's 256a, 256d, and 256e, as well as the data packets transmitted from the equipment compilers in the UPS 202 and utility 204 to the database 290. The power line segments can be determined to have common equipment (i.e., power panel 226b and STS 216*b*) for IT equipment 283. The flowchart for the power redundancy determination is further described with reference to FIG. 4.

Figure 3:
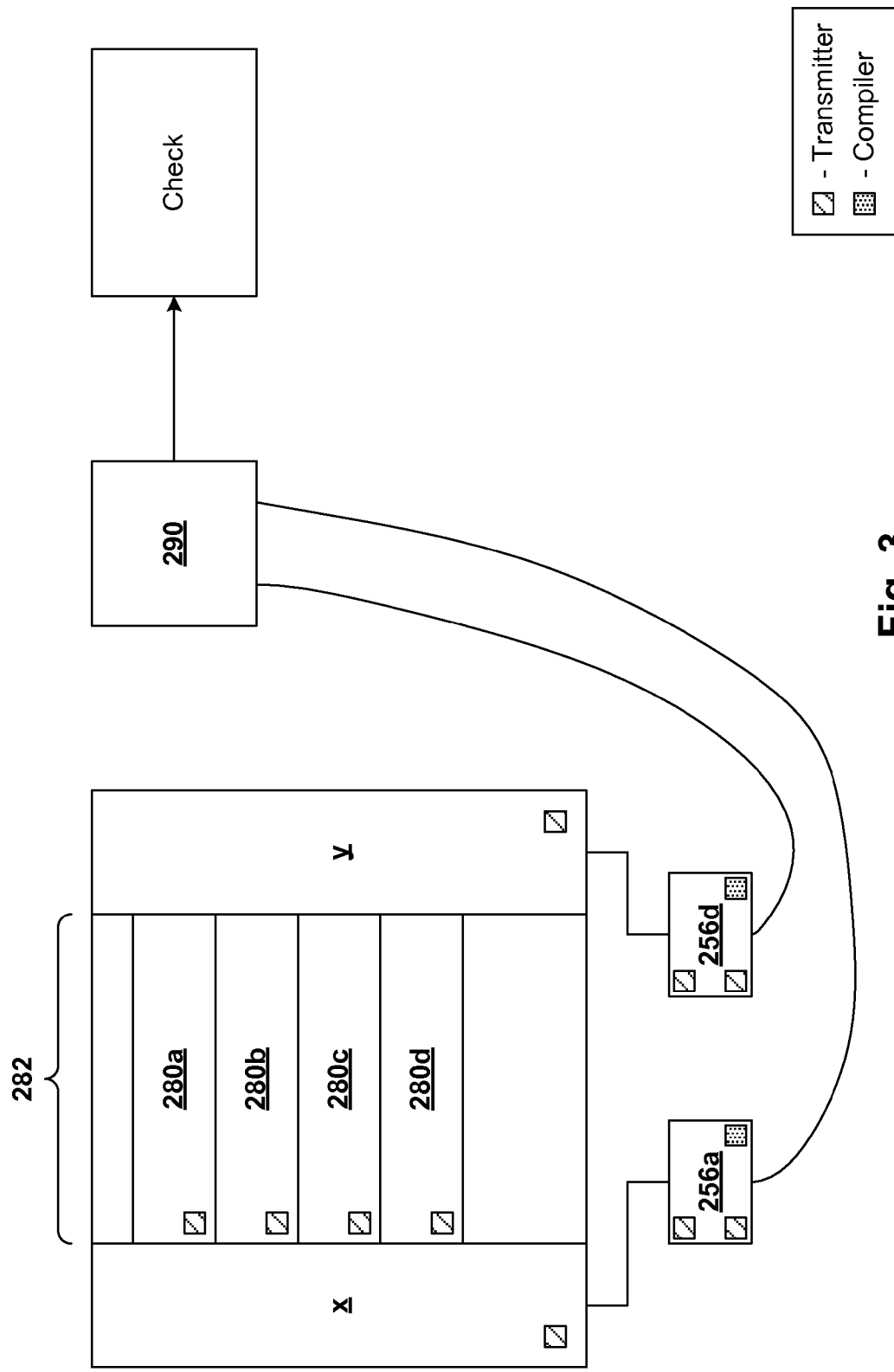
FIG. 3 illustrates a server rack including a plurality of servers and a data transmission path of unique server identifiers to a database, according to an embodiment.

Referring now to FIG. 3, a diagram of the IT equipment 282 is illustrated, according to an exemplary embodiment. More specifically, the diagram illustrates IT equipment 282 having four servers 280*a*-280*d* and a specific path of transmittal of the unique identifiers from the servers 280*a*-280*d* to the database 290. The servers 280*a*-280*d* have transmitters that transmit the unique identifiers to PDU x and PDU y. PDU x and PDU y transmit the server unique identifiers as well as PDU x and PDU y unique identifiers to PDU's 256*a* and PDU 256*d*, respectively. As discussed above, PDU's 256*a*, 256*d* are transformers so the equipment compilers send a data packet of unique identifiers to the database 290.

Once the database 290 receives the data packets, a redundancy check may be performed to determine whether or not each server has two or more discrete power line segments. The redundancy check may be performed by a program, such as, for example, the host program 114 (FIG. 1).

Figure 4:
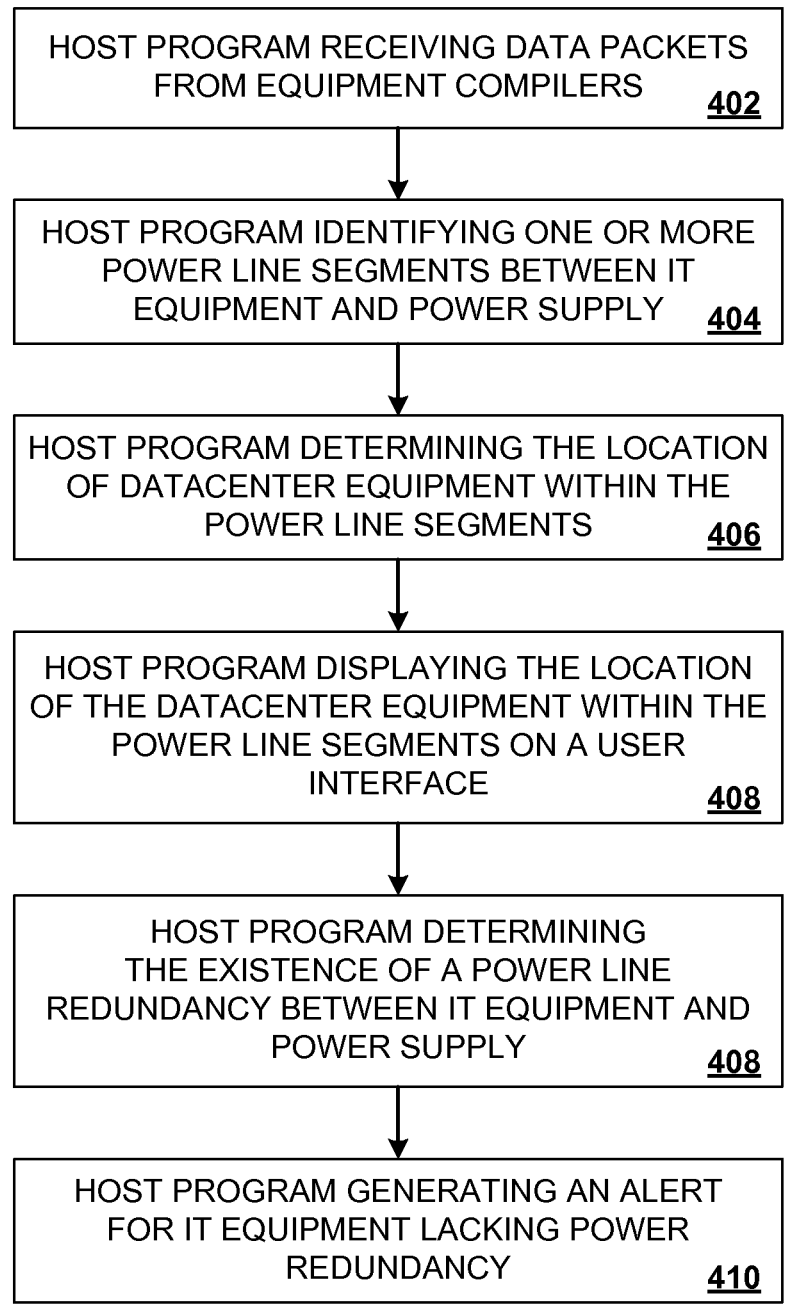
FIG. 4 illustrates an operational flowchart depicting the steps carried out by a program for identifying power line segments and power line redundancies in a datacenter, according to an embodiment.

Referring now to FIG. 4, an operational flowchart 400 depicts steps carried out by a program (e.g., host program 114 described with reference to FIG. 1) to determine power redundancies between IT equipment and power distribution units, according to an exemplary embodiment. More specifically, to determine and display the location of the IT equipment within a power line segment and to alert a user if IT equipment lacks power redundancy.

The operational flowchart 400 can start with a program (e.g., host program 114) receiving data packets from equipment compilers (Step 402). The data packets include the unique identifiers from each piece of datacenter equipment.

The program can identify one or more power line segments between the IT equipment and the power supply units from the data packets and unique identifiers (Step 404). The power line segments may be the power line that supplies the IT equipment with power from the power supply units, which may travel through other datacenter equipment, such as, for example, static transfer switches or PDU's.

The program determines the location of each piece of datacenter equipment within the power line segments from the data packets and unique identifiers (Step 406). The location may be within a single discrete power line segment between IT equipment and the power supply or may be overlapping with more than one power line segment. If there is datacenter equipment that is located within two power line segments, any equipment drawing power from that datacenter equipment may not have the desired power redundancy.

The program can display the location of the datacenter equipment within the power line segments on a user interface (Step 408). The display of the datacenter equipment may help provide feedback to IT specialists or users in determining whether or not to adjust power line segments.

The program can determine whether or not IT equipment has power redundancy through two or more power line segments to one or more power supplies (Step 408). In an exemplary embodiment, a power supply unit may supply power to IT equipment, such as, for example, a server rack, through two discrete power line segments which would be a desired redundancy in power.

The program can determine that IT equipment does not have a power redundancy, which may be undesirable. If the program determines that the IT equipment does not have power redundancy, the program can generate an alert to call attention to the location, configuration, and/or setup of the power flow to the IT equipment (Step 410).

Figure 5:
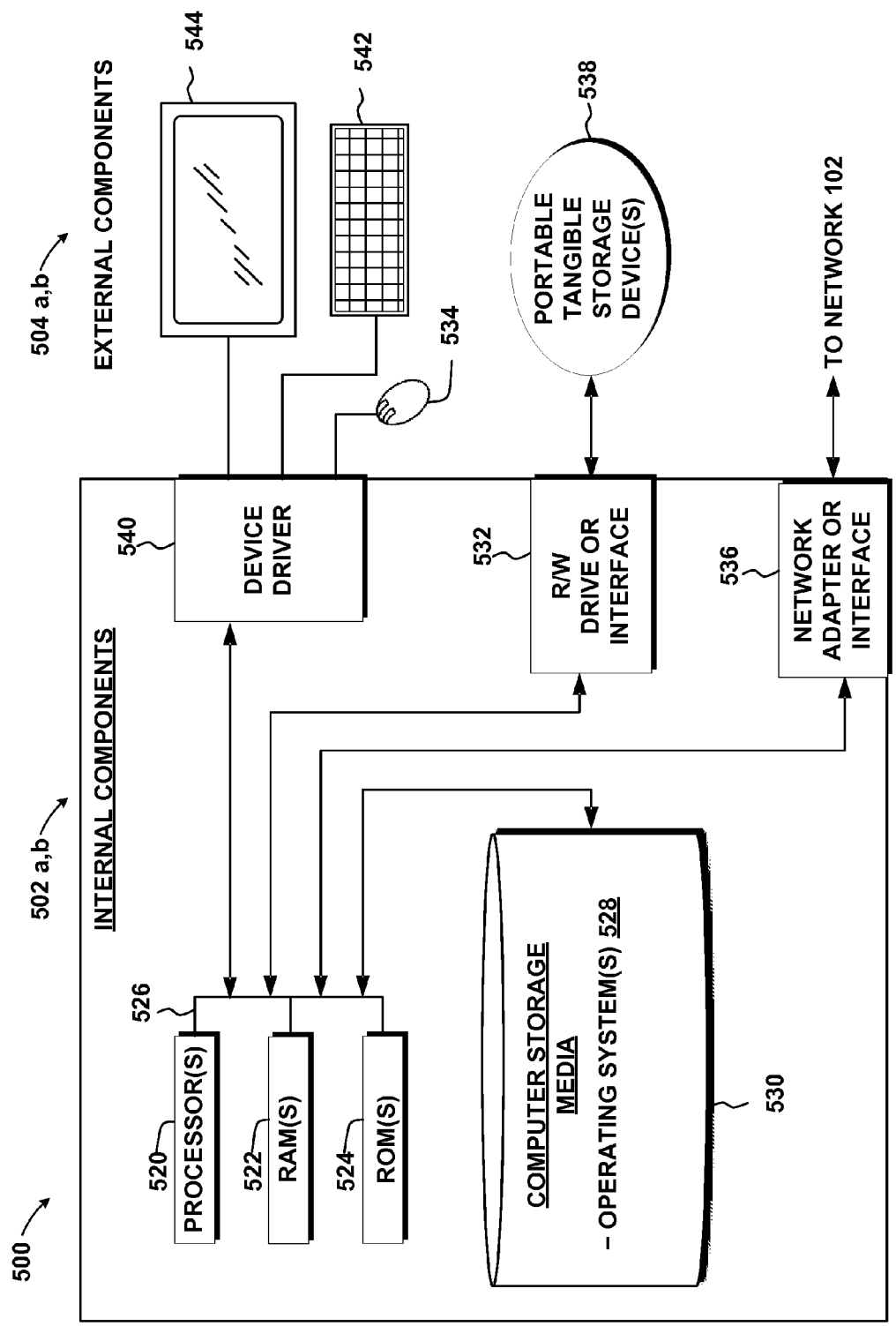
FIG. 5 illustrates a block diagram of internal and external components of computing devices and a central server, according to an embodiment.

Referring now to FIG. 5, a block diagram of internal and external components of computers described above is provided, according to an exemplary embodiment. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, IT equipment, a PDA, or other electronic devices. Examples of computing systems, environments, and/or configurations that may represented by data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

Computing device 130 (FIG. 1) and central server 110 (FIG. 1) may include respective sets of internal components 502 *a,b* and external components 504 *a,b* illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, host program 114, and agent programs 134, 124 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as host program 114 and agent programs 134, 124 (FIG. 1), can be stored on one or more of the respective portable computer-readable tangible storage devices 538, read via the respective R/W drive or interface 532 and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. Host program 114 and agent programs 134, 124 (FIG. 1) can be downloaded to computing device 130 (FIG. 1) and central server 110 (FIG. 1) from an external computer via a network (for example, the Internet, a local area network or other, wide area network) and respective network adapters or interfaces 536. From the network adapters or interfaces 536, host program 114, and agent programs 134, 124 are loaded into the hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542 and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

What is claimed is:

1. A method for identifying power supply path segments and power supply path redundancies in a datacenter, wherein the datacenter includes a plurality of power supply units (PSUs), a plurality of information technology equipment (ITE), a plurality of transforming power distribution units (PDUs) and a plurality of non-transforming PDUs, a database and a server computer, wherein downstream refers to a power supply path direction towards one of the plurality of ITEs, and upstream refers to a power supply path direction towards one of the plurality of PSUs, wherein each of the plurality of PSUs is connected over a respective power supply path segment to one or more of the plurality of transforming PDUs, each of the plurality of transforming PDUs is further connected over a respective power supply path segment to one or more of the plurality of non-transforming PDUs, and each of the plurality of non-transforming PDUs is further connected over a respective supply path segment to one of the plurality of ITE, wherein each of the plurality of transforming PDUs receives power at a first voltage, transforms the power to a second voltage, and distributes power at the second voltage, and each of the plurality of non-transforming PDUs receives power at a first voltage, does not transform the power to a second voltage, and distributes power at the received first voltage, the method comprising:

each of the plurality of ITE transmitting via a transmitter, using an Ethernet over power protocol, to each of the plurality of upstream non-transforming PDUs to which it is connected, a data packet that includes a unique identifier identifying the ITE;

each of the plurality of non-transforming PDUs receiving the unique identifiers from each of the plurality of downstream ITE to which it is connected, concatenating its unique identifier to each of the received unique ITE identifiers to create first concatenated identifiers, and transmitting via a transmitter, using an Ethernet over power protocol, to each of the plurality of upstream transforming PDUs to which it is connected, a data packet that includes the first concatenated identifiers;

each of the plurality of transforming PDUs receiving the first concatenated identifiers from each of the plurality of downstream non-transforming PDUs to which it is connected, concatenating its unique identifier to each of the received first concatenated identifiers to create second concatenated identifiers, compiling the second concatenated identifiers, transmitting the compiled second concatenated identifiers in a data packet to the database, and each of the plurality of transforming PDUs transmitting via a transmitter, using an Ethernet over power protocol, to each of the plurality of upstream PSUs to which it is connected, a data packet that includes a unique identifier identifying the transforming PDU;

each of the plurality of PSUs receiving the unique identifiers from each of the plurality of transforming PDUs to which it is connected, concatenating its unique identifier to each of the received unique identifiers from each of the plurality of transforming PDUs to create third concatenated identifiers, compiling the third concatenated identifiers and to transmit the compiled third concatenated identifiers in a data packet to the database;

the server computer identifying, based on the compiled packets received by the database, one or more power supply paths from each of the plurality of PSUs to each of the plurality of ITE, the location of each of the plurality of transforming and non-transforming PDUs and each of the plurality of ITE in the identified power supply paths, and to determine whether each of the plurality of ITE is powered by two or more discrete power supply paths.

2. The method of claim 1, further comprising displaying, by the server computer via a graphical user interface, the identified one or more power supply paths from each of the plurality of PSUs to each of the plurality of ITE, the location of each of the plurality of transforming and non-transforming PDUs and each of the plurality of ITE in the identified power supply paths, and whether each of the plurality of ITE is powered by redundant power supply paths.

3. The method of claim 2, further comprising generating, by the server computer, an alert in response to determining that an ITE is not powered by redundant power supply paths.

\* \* \* \* \*